(12) United States Patent
Toofan et al.

(10) Patent No.: US 6,895,157 B2
(45) Date of Patent: May 17, 2005

(54) THERMAL OPTICAL SWITCH APPARATUS AND METHODS WITH ENHANCED THERMAL ISOLATION

(75) Inventors: Mahmood Toofan, Milpitas, CA (US); Arianne L. Baker, Campbell, CA (US); Henry K. Yun, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/207,481

(22) Filed: Jul. 29, 2002

(65) Prior Publication Data

US 2004/0017990 A1 Jan. 29, 2004

(51) Int. Cl.[7] ............................................... G02B 6/22
(52) U.S. Cl. ........................... 385/129; 385/15; 385/16
(58) Field of Search ...................... 385/1, 3, 16, 20–23, 385/39–42

(56) References Cited

U.S. PATENT DOCUMENTS

| | | | | |
|---|---|---|---|---|
| 4,900,112 A | * | 2/1990 | Kawachi et al. | 385/14 |
| 5,418,868 A | * | 5/1995 | Cohen et al. | 385/16 |
| 6,341,498 B1 | * | 1/2002 | DiFoggio | 62/259.2 |
| 6,807,349 B2 | * | 10/2004 | Bazylenko | 385/127 |
| 6,825,966 B2 | * | 11/2004 | Webb et al. | 359/279 |
| 2004/0126051 A1 | * | 7/2004 | Bruel | |

FOREIGN PATENT DOCUMENTS

| | | | | |
|---|---|---|---|---|
| JP | 06059293 A | * | 3/1994 | G02F/1/313 |
| JP | 2000187192 A | * | 7/2000 | G02F/1/065 |
| JP | 2003084252 A | * | 3/2003 | G02F/1/01 |
| JP | 2003-228031 | * | 8/2003 | G02F/1/01 |

OTHER PUBLICATIONS

"Low switching power silica–based super high delta thermo–optic switch with heat insulating grooves" Sohma et al, Electronics Letters, Jan. 31, 2002, vol. 38, No. 3.*
"New Structure of Silica–Based Planar Lightwave Circuits for Low–Power Thermooptic Switch and its Application to 8×8 Optical Matrix Switch", Kasahara et al, Journal of LIghtwave Technology, vol. 20, No. 6, Jun. 2002.*
"Low–Power Consumption Silica–Based 2×2 Thermooptic Switch Using Trenched Silicon Substrate", Kasahara et al, IEEE Photonics Technology Letters, vol. 11, No. 9, Sep. 1999.*
"Compact and Low driving power silica–based 1×N planar lightwave circuit switches with super high delta waveguides and heat insulating grooves", Sohma et al, Lasers and Electro–Optics Society, LEOS 2002, vol.: 2, Nov. 10–14, 2002, pp. 732–733.*
Lai, Q. , et al., "Low–Power Compact 2×2 Thermooptic Silica–on–Silicon Waveguide Switch with Fast Response", *IEEE Photonics Technology Letters*, vol. 10, No. 5, (May 1998), 681–683.

* cited by examiner

*Primary Examiner*—Ellen E. Kim
(74) *Attorney, Agent, or Firm*—Schwegman, Lundberg, Woessner & Kluth, P.A.

(57) ABSTRACT

Thermal optical switch apparatus with enhanced thermal isolation includes a cladding region with first and second spaced apart waveguide cores buried therein to form first and second waveguides. A thermal insulation barrier filled with insulating material is formed in the cladding between the first and second waveguides to thermally isolate the waveguides. In one embodiment, the insulating material is an aerogel. Methods of operation are also described.

27 Claims, 3 Drawing Sheets

THERMAL OPTICAL SWITCH APPARATUS AND METHODS WITH ENHANCED THERMAL ISOLATION

TECHNICAL FIELD

The field of the invention relates to thermal optical switches for guided-wave optics and photonics applications.

BACKGROUND INFORMATION

Optical telecommunication systems require a variety of devices for generating, transmitting, amplifying, filtering, switching, detecting and otherwise processing optical signals. Certain of these devices are integrated optical components that utilize a number of optical waveguides formed on a single substrate so that optical signals traveling in the respective waveguides can be locally processed. Like integrated electrical circuits, there is constant pressure to increase the degree of integration of integrated optical devices and components so they can be made smaller and less expensive to produce and operate.

One example of an integrated optical device (apparatus) used in telecommunications for optical switching applications is an integrated optical Mach-Zender interferometer.

FIG. 1 is a plan view of a section of a prior-art Mach-Zender interferometer 10 thermal optical switch apparatus having two separated waveguides, with a heating element over one of the waveguides to perform thermal optical switching. Waveguides 16 and 20 represent the two arms of the interferometer and have respective output ends ("ports") 22 and 24. The waveguides are formed on a substrate 26. Waveguide 16 supports a lightwave 30, and waveguide 20 supports a lightwave 32. Interferometer 10 includes a central section 40 where the waveguides are parallel and separated by a distance D1 such that no coupling between the waveguides occurs. Surrounding central section 40 are first and second coupling sections 42 and 44 in which coupling between the waveguides occurs.

Atop waveguide 16 in central section 40 is a heating element 50 that selectively heats a portion of length L of the waveguide. The change in temperature $\Delta T$ of waveguide 16 in section 40 over the select portion results in a change in refractive index $\Delta N$ of the material making up the waveguide over that portion. This refractive index change in the waveguide over a select distance translates into a difference in the phase between the interferometer arms.

When the phase difference between the interferometer arms is zero, lightwave 30 initially inputted into waveguide 16 upstream of first coupling section 42 is transferred entirely to waveguide 20 in coupling sections 42 and 44 to form lightwave 32, which is outputted at output port 24. However, the phase difference between the interferometer arms can be altered through heating via heating element 50. The change in phase difference changes the amount of light coupled from waveguide 16 to waveguide 20 at second coupling section 44 and thus the balance of light outputted at output ports 22 and 24. This is the basis for a thermal optical switch (TOS).

In interferometer 10, the distance D1 must be great enough to prevent heating of waveguide 20 when waveguide 16 is heated. If waveguide 20 is not properly thermally isolated from waveguide 16, it too will experience a change in temperature, which will reduce the temperature differential and thus the phase differential between the waveguides. This in turn diminishes switching performance. Unfortunately, providing the needed thermal isolation by spacing the waveguides farther apart takes up valuable substrate space and reduces the degree of integration of the apparatus.

Certain prior art interferometers include an air-filled trench between waveguides 16 and 20 to provide thermal insulation, which allows the waveguides to be placed closer together. However, there is still pressure to increase the degree of integration and reduce the amount of power needed to operate the apparatus. This is due in part to the fact that tens to hundreds of interferometer apparatus like apparatus 10 may be formed on a single substrate, with each apparatus requiring about 0.5 W to operate. This results in a substantial thermal budget for a given substrate. It is therefore desirable to further increase the level of integration of interferometer-based thermal switch apparatus while also maintaining or decreasing their thermal energy budget.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice them, and it is to be understood that other embodiments may be utilized and that changes may be made without departing from their scope. The following detailed description is, therefore, not to be taken in a limiting sense, and the scope of the present invention is defined only by the appended claims.

Figure 1:
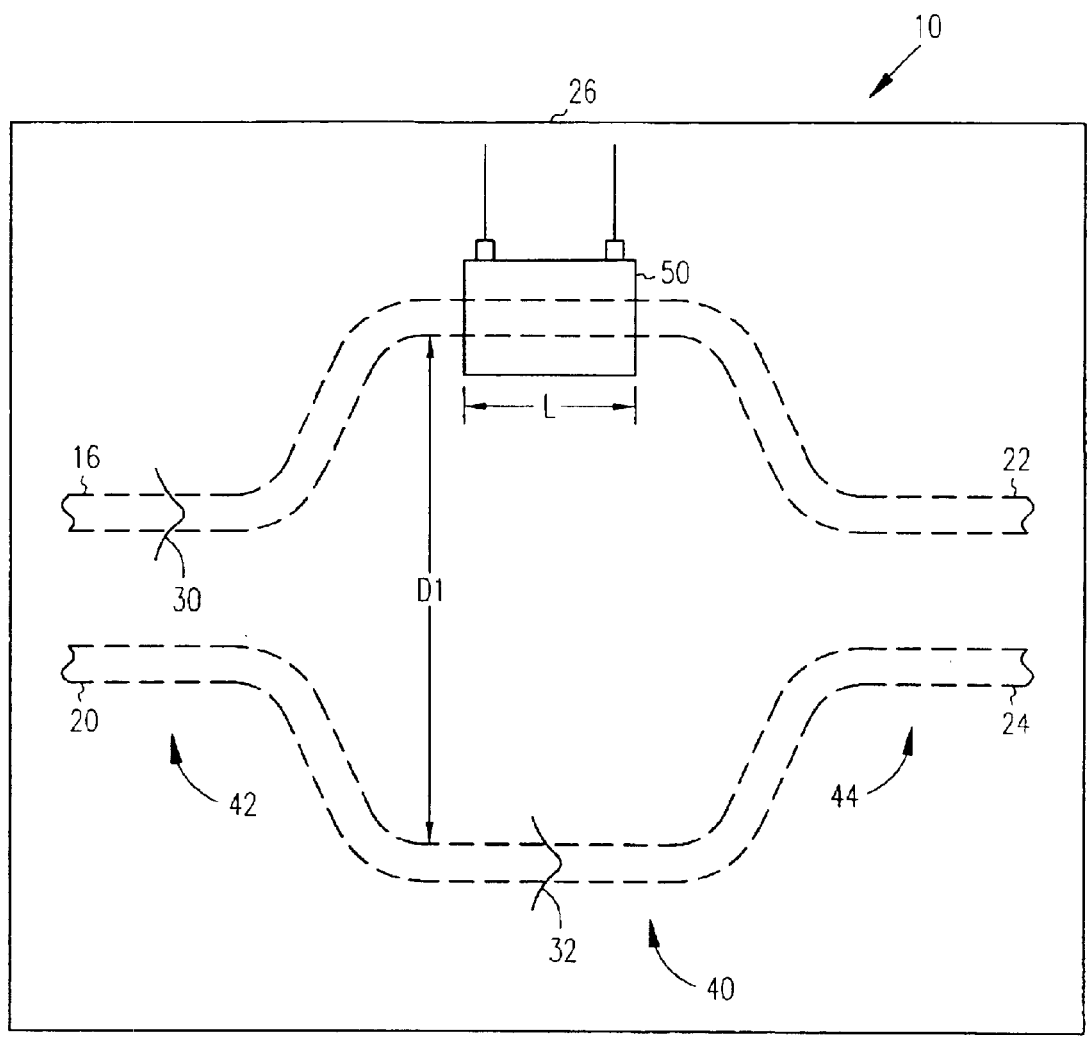
FIG. 1 is a plan view of a section of a prior art Mach-Zender interferometer thermal optical switch apparatus having two separated waveguides, with a heating element over one of the waveguides to perform thermal optical switching.
Figure 2:
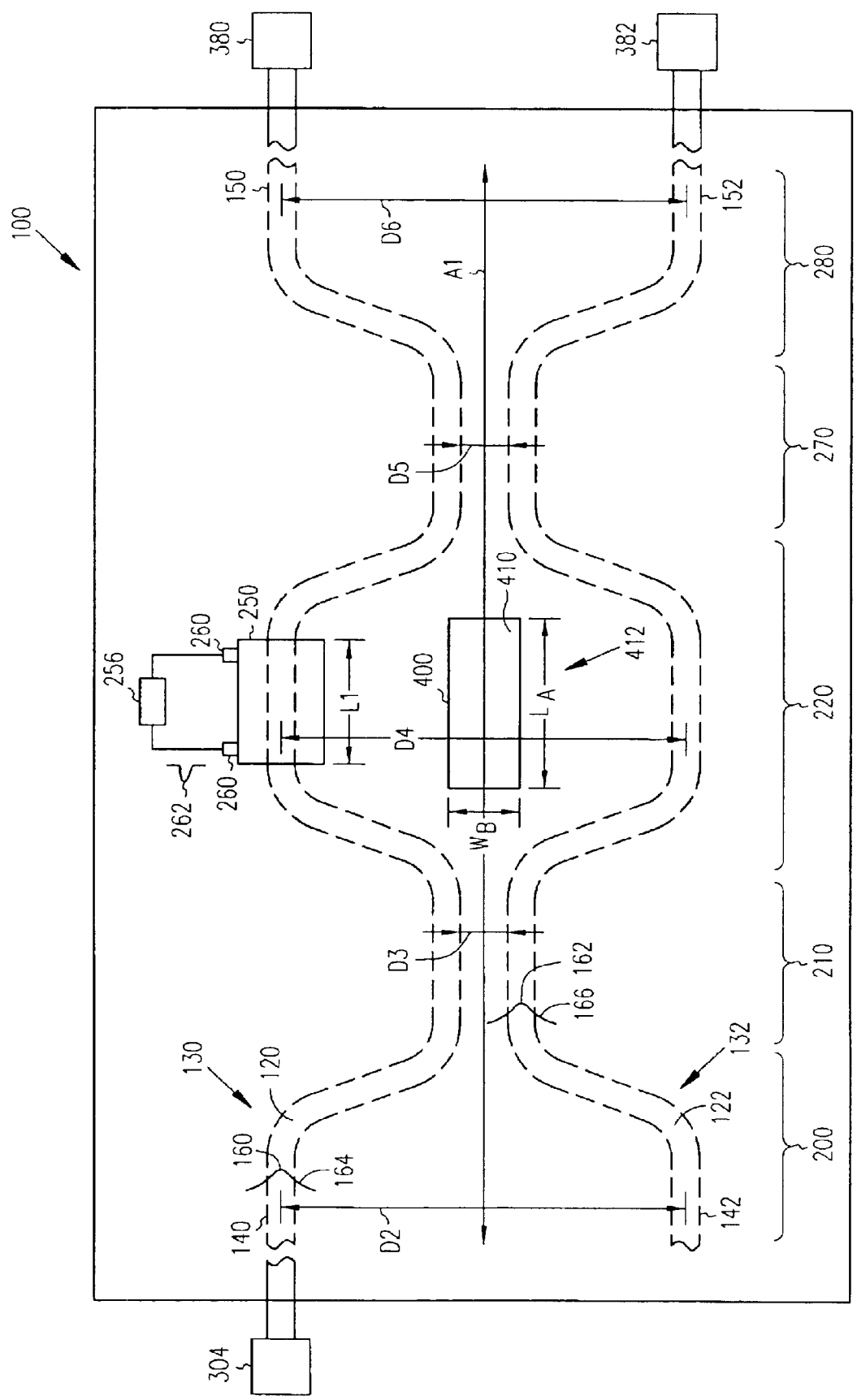
FIG. 2 is a plan view of an example embodiment of an integrated optical Mach-Zender interferometer (MZI) apparatus of the present invention.

FIG. 2 is a plan view of an example embodiment of an integrated optical Mach-Zender interferometer (MZI) apparatus 100 of the present invention. Apparatus 100 is capable of operating as a thermal optical switch, as is described in detail below.

Figure 3:
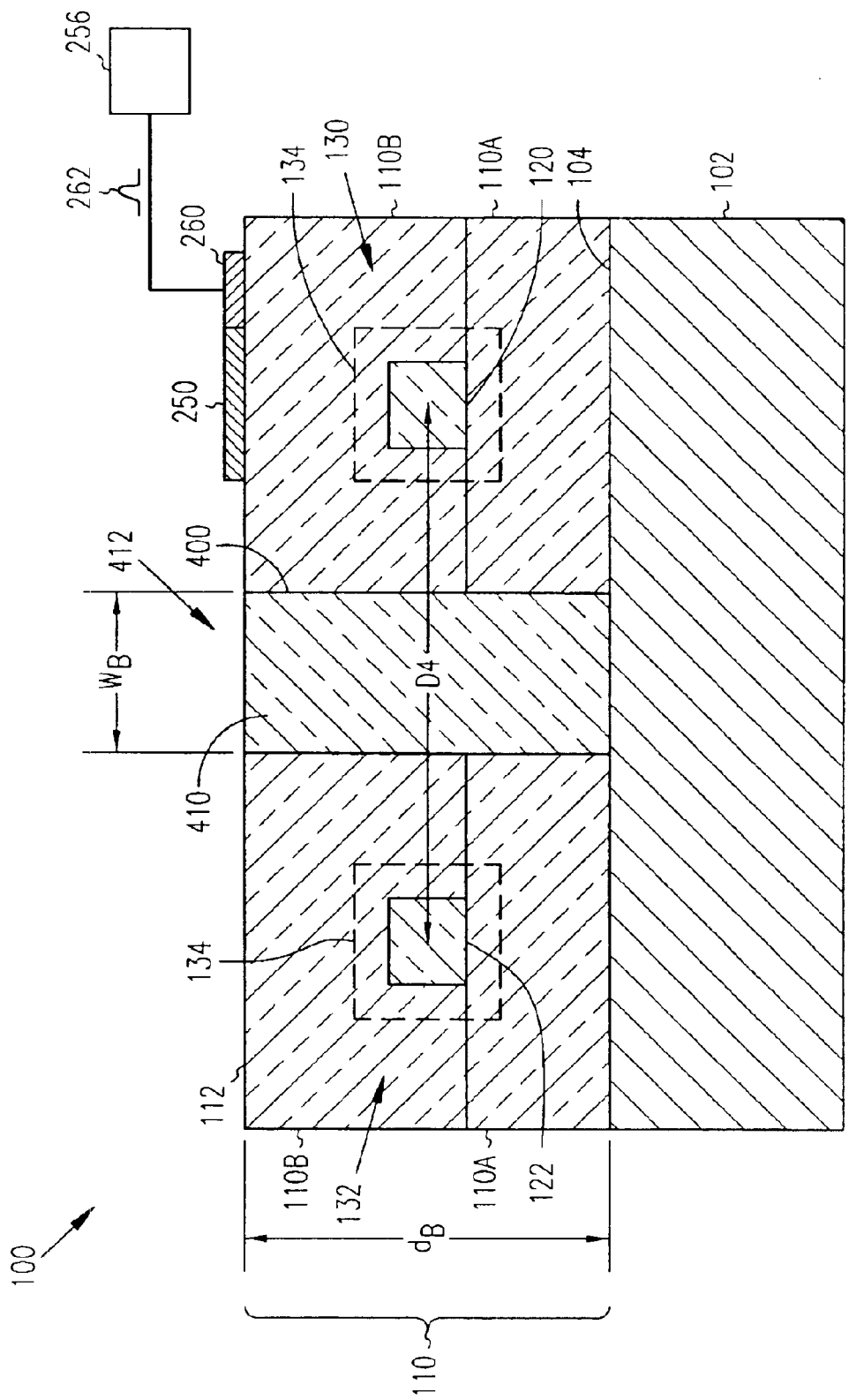
FIG. 3 is a cross-sectional view of the apparatus of FIG. 2 taken along the line 3—3.

FIG. 3 is a cross-sectional view of apparatus 100 taken along the line 3—3 in FIG. 2.

Referring now to both FIGS. 2 and 3, apparatus 100 includes a substrate 102 having an upper surface 104. In an example embodiment, substrate 102 is silicon or silica. A cladding ("cladding") 110 with an upper surface 112 resides atop or above upper surface 104. Buried in cladding 110 are two waveguide cores ("cores") 120 and 122 that, in combination with small portions 134 (dotted line) of cladding 110 surrounding each of the cores, define waveguides 130 and 132. Waveguides 130 and 132 have respective input ends 140 and 142 and respective output ends (ports) 150 and 152.

In an example embodiment, cladding 110 includes a lower cladding layer 110A formed adjacent substrate upper surface 104, and an upper cladding layer 110B formed atop the lower cladding layer 110A. Further, in the example embodiment, cores 120 and 122 are formed by depositing a core layer over lower cladding layer 110A, covering the core layer with a thin layer of photoresist, exposing the photoresist with a pattern of light, developing the exposed photoresist layer, etching the photoresist that remains after development to create a patterned core layer, and then covering the patterned core layer with upper cladding layer 110B. In this example embodiment, the material making up core 120 is the same as the material making up core 122. For the sake of simplicity, cladding 110 is discussed below as if it were a unitary structure, with cores 120 and 122 embedded therein to form waveguides 130 and 132.

Waveguides 130 and 132 are each capable of supporting guided lightwaves 160 and 162 having respective evanescent tails 164 and 166 that extend beyond their corresponding waveguide cores and into the surrounding cladding 110. The refractive index of cores 120 and 122 must be greater than that of cladding 110 for waveguides 130 and 132 to support respective guided lightwaves 160 and 162. The degree to which evanescent tails 164 and 166 extend into cladding 220 depends on the refractive index difference $\Delta n$ between the core and the cladding (the smaller the $\Delta n$, the larger the evanescent tail).

In an example embodiment, cladding 110 is low-index silica (e.g., a thermal oxide of silica), and cores 120 and 122 are formed from high-index doped silica (e.g., a germanium-doped silica). In an example embodiment, the refractive index difference $\Delta n$ ranges anywhere from about 0.2% to up to about 2.5%.

Apparatus 100 has several different sections each designed to perform a specific function. In order, from left to right along axis A1 in FIG. 2, apparatus 100 includes an input section 200 where waveguides 130 and 132 are separated by a distance D2 such that there is no optical coupling between the waveguides. In an example embodiment, distance D2 is anywhere from about 200 to about 300 microns.

Adjacent input section 200 is a first coupling section 210 wherein waveguides 108 and 110 are separated by a distance D3 that allows for evanescent coupling between waveguides 130 and 132. In an example embodiment, distance D3 is anywhere from about 3 to about 5 microns. In the standard Mach-Zender interferometer geometry, first coupling section is typically designed to be a "3 dB" coupler, i.e., half the power in lightwave 160 traveling in waveguide 130 is coupled into waveguide 132 and travels therein as lightwave 162.

Adjacent first coupling section 210 is a central section 220 in which waveguides 130 and 132 are separated by a distance D4 such that there is no evanescent coupling between the waveguides. Central section 220 includes a heating element 250 of length L1 formed on or above cladding upper surface 112 and arranged over waveguide 130. Heating element 250 is formed using, for example, successive photolithography and metal etch steps. A power source 256 (e.g, a voltage supply) is connected to heating element 250 via contact pads 260. Heating element 250 is activated by an electrical signal 262 from power source 256. Heating element 250 is designed to transmit heat through the portion of the cladding below the heating element to heat a portion of waveguide 130 to create a phase difference between the interferometer arms as mentioned above and discussed in greater detail below.

Adjacent central section 220 is an second coupling section 270 wherein waveguides 130 and 132 are separated by a distance D5 such that the waveguides are evanscently coupled. In the standard Mach-Zender interferometer geometry, second coupling section 270 is typically designed to be a 3 dB coupler just like the first coupling section 210 so that the remainder of lightwave 160 traveling in waveguide 130 is coupled into waveguide 132.

Adjacent second coupling section 270 is an output section 280 wherein waveguides 130 and 132 are separated by a distance D6 such that there is no evanescent coupling between the waveguides 130 and 132. In an example embodiment, distance D6 is the same as or approximately equal to distance D2.

Briefly, in the operation of apparatus 100 as described thus far, lightwave 160 is inputted into waveguide 130 at input end 140 at input section 200. In an example embodiment, lightwave 160 is generated by a light source 304 optically coupled to waveguide 130 at or upstream of input end 140. In an example embodiment, light source 304 is a laser, such as an erbium-doped fiber laser; however, light source 304 could be implemented with any other suitable type of laser or light-generating element, such as a diode laser.

Lightwave 160 propagates to first coupling section 200, where a portion (e.g., 50%) of the lightwave 160 is evanescently coupled to waveguide 132 and travels therein as lightwave 162. Lightwaves 160 and 162 then continue in respective waveguides 130 and 132 to central section 220. When heating element 250 is activated via electrical signal 262 from power source 256, it heats the portion of waveguide 130 residing underneath the heating element 250. The change in temperature $\Delta T$ of the waveguide 130 results in a change in refractive index $\Delta N$ of the material making up the waveguide 130. The refractive index change $\Delta N$ in turn translates into a change in the optical path length OPL=(L1)($\Delta N$), which in turn translates into a difference in phase $\Delta \Phi = (2\pi/\lambda)$OPL of lightwave 160 as compared to the phase of lightwave 162 traveling in waveguide 132.

Where the phase difference $\Delta \Phi$ is zero, the portion of lightwave 160 remaining in waveguide 130 in central section 220 is transferred to waveguide 132 at coupling section 270 so that all the power inputted into waveguide 130 as lightwave 160 is outputted at output port 152 of waveguide 132 as lightwave 162 at output section 280. When the phase difference $\Delta \phi$ is $\pi$, then lightwave 162, coupled into waveguide 132 in first coupling section 210, is coupled back into waveguide 130 at second coupling section 270. Thus, all of the power in inputted lightwave 160 is outputted from port 150 of waveguide 130 at output section 280.

In an example embodiment, heating element 250 provides about 0.42 Watts of power to induce a temperature change $\Delta T$ of about 25° C., which results in a $\Delta N$ of about $1.22 \times 10^{-3}$. This index change corresponds to a $\pi$ phase change for a wavelength $\lambda$ of 1.55 microns. When the phase difference $\Delta \Phi$ is other than 0 or $\pi$, then the light is split between waveguides 130 and 132 in varying amounts corresponding to the actual phase difference.

Once lightwaves 160 and 162 pass through second coupling section 270, the light exiting waveguide 132 and/or waveguide 132 at output ports 150 and 152 is detected by respective photodetectors 380 and 382. In an example embodiment, photodetectors 380 and 382 are PIN (p-type/intrinsic/n-type) photodetectors.

As mentioned above, in central section 220, the distance D4 must be large enough to prevent heating of waveguide 132 when waveguide 130 is heated. If waveguide 132 is not properly thermally isolated from waveguide 130, it will experience a change in temperature, which will reduce the temperature differential $\Delta T$ between the waveguides. A reduction in the temperature differential ΔT results in a reduced index differential ΔN and hence a reduced phase differential ΔΦ between the interferometer arms. This diminishes the performance of apparatus 100, e.g., it reduces the switching efficiency because too much or too little energy is transferred between the waveguides. In certain cases, the performance can be improved by providing additional heating via heating element 250, but this increases the thermal budget of the apparatus.

Accordingly, central section 220 includes a trench 400 formed in central section 220 between waveguides 130 and 132. Trench 400 extends downward from cladding upper surface 112, and in an example embodiment, trench 400 extends all the way down to substrate upper surface 104. In an example embodiment, trench 400 is formed using standard lithographic techniques, and in one embodiment trench 400 is formed using a deep etch.

Trench 400 is filled with a thermal insulating material 410 to form a thermal insulation barrier 412. In an example embodiment, insulating material 410 is initially a fluid and is flowed into trench 400 using, for example, a spin-on technique similar to that used for applying photoresist on semiconductor wafers. Excess insulation material is then removed by successive photolithography and etch steps, or by standard planarization techniques. In an example embodiment, a solvent may be used to make the insulating material fluidic (e.g., into a gel). In such cases, the solvent is removed by chemical or thermal processing to solidify the insulating material once it is in the trench 400.

In an example embodiment, insulating material 410 is an "aerogel." An aerogel is a highly porous material with a very low density (e.g., a few times the density of air) and a thermal conductivity less than that of air. In an example embodiment, a silica-based aerogel is used in combination with silicon-based processing and materials (e.g., a silica or silicon substrate 102). Example aerogels include silica gel, alumina gel, tungsten gel, ferric oxide gel, and cellulose nitrate gel. Aerogels can be obtained from a variety of sources, one such source being Nanopore, Inc., Albuquerque, N.Mex.

In an example embodiment, thermal insulation barrier 412 has a width $W_B$ between about 50 to about 100 microns. Further in an example embodiment, the axial length $L_A$ of thermal insulation barrier 412 is between about 25 and about 50 microns, and the depth $d_B$ is about 30 to about 40 microns. Thermal insulation barrier 412 serves to thermally isolate waveguide 130 from waveguide 132 so that the waveguides can be placed closer together to one another than otherwise possible. This makes for a higher level of integration of apparatus 100.

In an example embodiment, distance D4 separating waveguides 130 and 132 is only slightly greater than the width of insulation barrier 412. Thus, in an example embodiment where insulation barrier 412 has a width of X microns, distance D4 is X+Y, where Y>10 microns. In an example embodiment, X=50 microns and Y=20 microns, so that D4=70 microns, which is much less than the distance of about 250 microns required by apparatus of the prior art. The actual distance D4 selected depends on the particular application and apparatus parameters.

Further in an example embodiment, the distance D4 separating waveguides 130 and 132 is selected to be a "minimum distance." The "minimum distance," as the term is used herein, represents the closest possible spacing between the waveguides such that heating waveguide 130 does not result in heating waveguide 132 to the extent that the performance of apparatus 100 is diminished. Thus, at and beyond the minimum distance, apparatus 100 has enhanced thermal isolation between the waveguides as compared to apparatus of the prior art.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

While certain elements have been described herein relative to "upper" and "lower", and "left" and "right", it will be understood that these descriptors are relative, and that they could be reversed if the elements were inverted, rotated, or mirrored. Therefore, these terms are not intended to be limiting.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An optical apparatus comprising:
   a cladding with an upper surface;
   a Mach-Zender interferometer having first and second spaced apart waveguide cores in the cladding to form first and second waveguides; and
   a thermal insulation barrier comprising a solid insulating material and formed in the cladding between the first and second waveguides to thermally isolate at least a portion of the first and second waveguides, wherein the solid insulating material is a material different from the cladding such that the thermal insulation barrier substantially thermally isolates at least the portion of the first and second waveguides when heating is applied to the first waveguide.

2. The optical apparatus of claim 1, wherein the first and second waveguides are arranged in a central section of the Mach-Zender interferometer surrounded by first and second coupling sections.

3. The optical apparatus of claim 2, further including a heating element arranged over one of the first and second waveguides within the central section.

4. The optical apparatus of claim 2, wherein the Mach-Zender interferometer serves as a thermal optical switch.

5. The optical apparatus of claim 1, wherein the cladding is formed on a substrate and the thermal insulation barrier extends down from the upper surface to the substrate.

6. The optical apparatus of claim 1, wherein the solid insulating material includes an aerogel.

7. The optical apparatus of claim 1, wherein the first and second waveguides are spaced apart by a minimum distance.

8. An optical apparatus comprising:
a substrate with an upper surface;
a cladding formed atop the substrate upper surface and having a cladding upper surface;
a Mach-Zender interferometer having first and second spaced apart waveguide cores formed within the cladding so as to form first and second waveguides; and
a trench formed in the cladding upper surface and extending toward the substrate and formed between the first and second spaced apart waveguide cores, the trench containing a solid thermal insulating material so as to form a thermal insulation barrier having a thermal conductivity less than that of air, wherein the solid insulating material is a material different from the cladding such that the thermal insulation barrier substantially thermally isolates the first and second spaced apart waveguide cores when heating is applied to the first spaced apart waveguide.

9. The optical apparatus of claim 8, wherein the cladding comprises an upper cladding layer and a lower cladding layer.

10. The optical apparatus of claim 8, wherein the waveguide cores are spaced apart by a minimum distance.

11. The optical apparatus of claim 8, wherein the solid thermal insulating material comprises an aerogel.

12. The optical apparatus of claim 8, further including a heating element arranged over one of the first and second waveguides.

13. The optical apparatus of claim 12, further including a power source electrically coupled to the heating element.

14. The optical apparatus of claim 13, wherein the heating element is arranged over the first waveguide, and further including a light source coupled to an input end of the first waveguide.

15. The optical apparatus of claim 14, wherein the light source is a diode laser.

16. The optical apparatus of claim 14 further including first and second photodetectors arranged at respective output ends of the first and second waveguide cores.

17. The optical apparatus of claim 16, wherein the first and second photodetectors include PIN photodetectors.

18. A method comprising:
embedding first and second waveguide cores in a cladding to form first and second waveguides arranged to form a Mach-Zender interferometer having a central section surrounded by first and second coupling sections;
forming a trench in the cladding between the first and second waveguides in the central section; and
inserting a solid thermal insulating material into the trench so as to form a thermal insulation barrier having a thermal conductivity less than that of air, wherein the solid thermal insulating material is a material different from the cladding such that the thermal insulation barrier substantially thermally isolates the first and second waveguide cores when heating is applied to the first waveguide core.

19. The method of claim 18, including arranging the first and second waveguides spaced apart by a minimum distance.

20. The method of claim 18, wherein inserting a solid thermal insulating material includes depositing an aerogel.

21. The method of claim 18, including forming the first and second waveguide cores to be separated by a minimum distance of about 70 microns in the central section.

22. The method of claim 18, further including forming a heating element over one of the waveguide cores within the central section.

23. The method of claim 18, further including:
forming the cladding atop a substrate; and
forming the trench to extend down to the substrate.

24. A method comprising:
introducing a first lightwave into a first waveguide of a Mach-Zender integrated optical interferometer, the Mach-Zender integrated optical interferometer having a second waveguide and a solid thermal insulation barrier disposed in a cladding region between the first and second waveguides in a spaced section of the Mach-Zender integrated optical interferometer; and
heating a portion of the first waveguide in the spaced section while blocking heat from reaching the second waveguide with the solid thermal insulation barrier, wherein the solid thermal insulating barrier is a material different from the cladding such that the thermal insulation barrier substantially thermally isolates the first and second waveguides when heating is applied to the first waveguide.

25. The method of claim 24, further including:
coupling a portion of the first lightwave into the second waveguide at a first coupling section adjacent the spaced section to form a second lightwave traveling in the second waveguide.

26. The method of claim 25, wherein the heating is performed to induce a select phase change in the first lightwave when the first lightwave passes through the spaced section.

27. The method of claim 25, wherein introducing the first lightwave into the first waveguide includes coupling a light source to the first waveguide and generating the first light wave with the light source.

* * * * *